United States Patent Office 3,794,687
Patented Feb. 26, 1974

3,794,687
SUBSTITUTED BIS(FLUOROALKYLSULFONYL) HALOMETHANES
Robert J. Koshar, Lincoln Township, Washington County, Minn., assignor to Minnesota Mining & Manufacturing Company, St. Paul, Minn.
No Drawing. Filed Jan. 20, 1972, Ser. No. 219,534
Int. Cl. C07c 147/02
U.S. Cl. 260—607 A    3 Claims

ABSTRACT OF THE DISCLOSURE

Non-acidic substituted bis(fluoroalkylsulfonyl)-halomethanes of the formula WY generate acid on heating or exposure to ultraviolet light and are useful as oxidizing agents, halogenating agents and as latent catalysts for the polymerization of epoxides, vinyl ethers and N-vinyl compounds.

In these compounds, W is halo-bis(fluoroalkylsulfonyl) methyl and Y is a hydrocarbon radical which when substituted by a halogen or a lower alkoxy substituent may be of up to about 25 carbon atoms and when unsubstituted or omega alkenyl may be of up to 18 carbon atoms or Y may be halogen of atomic weight 35 to 80 inclusive as a hydrocarbon group Y may be straight, branched or cyclic.

---

This invention relates to novel bis(fluoroalkylsulfonyl) halomethanes, their use, particularly as catalysts, and to methods for preparation thereof.

Unsubstituted bis(perfluoroalkylsulfonyl)methanes are described by Brice and Trott in U.S. Pat. No. 2,732,398 (1956) and by Gramstad and Haszeldine in J. Chem. Soc. 4069 (1957) and certain substituted methyl perfluoroalkyl sulfones are described by Heine in U.S. Pat. No. 3,281,472 (1966) and by Yagupolskii and co-workers in Russian publications. These perfluoroalkylsulfonyl compounds are conveniently prepared by reaction of the corresponding perfluoroalkanesulfonyl fluorides with a methylmagnesium halide or alkyl lithium.

Bis(perfluoroalkylsulfonyl)methanes having a hydrogen on the carbon atom bearing two sulfonyl groups are strongly acidic compounds. Because of the strong acidic nature of these bis(perfluoroalkylsulfonyl)methanes, they are useful for catalyzing the polymerization of cation-sensitive monomers, e.g., epoxides, vinyl ethers, N-vinyl compounds, etc. Such catalyzed monomer compositions have many applications such as, for example, adhesives, surface coatings, potting, laminates, foams and the like. However, such acid catalyzed monomer compositions possess no latency and must be used without delay after mixing because polymerization of the monomer begins on addition of the catalysts.

It is an aim or object of the invention to provide substituted bis(fluoroalkylsulfonyl))halomethanes. Other objects will become apparent from the disclosure hereinbelow.

In accordance with the aims and objects of the invention, substituted bis(fluoroalkylsulfonyl))halomethanes are provided that are represented by the formula WY where W is a halo-bis(fluoroalkylsulfonyl)methyl group in which the halogen has an atomic weight from 35 to 80 inclusive and Y is an oxidatively and ionically neutral, substituted or unsubstituted, straight, branched or cyclic hydrocarbon radical, of up to about 25 carbons atoms when substituted and up to 18 carbon atoms when unsubstituted, or halogen of atomic weight from 35 to 80 inclusive. Ionically neutral means that there is no reaction with a metallic carbonate such as sodium carbonate in aqueous or alcoholic solution below 50° C. and oxidatively neutral means that positive-halogen oxidizing agents, such as N-bromosuccinimide, are without effect in the absence of free radical initiators. By fluoroalkyl is meant monovalent fluorinated aliphatic radicals containing 1–18 carbon atoms and at most other than fluorine atoms, one hydrogen atom or chlorine atom substituent for every two carbon atoms and at most other than carbon atoms in the skeletal chain not more than one oxygen atom or one trivalent nitrogen atom per two skeletal carbon atoms and bonded only to carbon atoms. The preferred group of bis(fluoroalkylsulfonyl)halomethanes are those represented by the formula:

(Formula I)

wherein $R^1_f$ and $R^2_f$ are the same or different monovalent fluorinated straight or branched chain or cyclic alkyl radical containing 1 to 18 carbon atoms fully fluorinated except for not more than one of hydrogen, chlorine, oxygen or trivalent nitrogen for each two carbon atoms, said hydrogen and chlorine being nonreactive to methyl magnesium halide and said oxygen and trivalent nitrogen being bonded exclusively to carbon, X is halogen of atomic weight from 35 to 80 inclusive and Y′ is a monovalent radical selected from the group consisting of halogen of atomic weight from 35 to 80 inclusive, unsubstituted hydrocarbon radicals containing up to 18 carbon atoms, omega-alkenyl having 3 to 18 carbon atoms of the formula $-(CH_2)_n-CH=CH_2$ in which $n$ is an integer from 1 to 16, and substituted hydrocarbon radicals containing a substituent of the group of halogen, lower alkoxy, alkoxycarbonyl, and acyloxy groups containing up to a total of 7 carbon atoms.

Examples of fluorinated alkyl radicals or fluoroaliphatic radicals that may be present in the substituted bis(fluoroalkylsulfonyl)halomethanes of the invention include perfluoromethyl, perfluorobutyl, perfluorooctyl, perfluorododecyl, perfluoroisopropyl, perfluoro-2,4,4-trimethylpentyl, perfluoro(2-cyclohexylethyl), omegahydroperfluorooethyl, 2-chloroperfluorooctyl, omegachloroperfluorohexyl, perfluoro(3-morpholinopropyl), perfluoro(3-piperidinopropyl), and perfluoro(2-ethoxyethyl). The preferred fluorinated alkyl radicals are perfluoroalkyl radicals.

By the term hydrocarbon radicals, it is meant to include straight chain, branched chain and cyclic alkyl radicals containing up to 18 carbon atoms such as, for example, methyl, ethyl, propyl, isopropyl, 2,4,4-trimethylpentyl, dodecyl, octadecyl, cyclohexyl, and 4-ethylcyclohexyl; aralkyl radicals containing up to 14 carbon atoms such as, for example, benzyl, 2-phenylethyl, 4-methylbenzyl, 1-naphthylmethyl, 2-naphthylmethyl; aryl radicals containing up to 14 carbon atoms which are mononuclear, binuclear or trinuclear such as, for example, phenyl, tolyl, 4-t-butylphenyl, 2,4-bis(t-butyl)phenyl, 4-dodecylphenyl, 1-naphthyl, 2-naphthyl, anthryl, 4-phenylphenyl, and 4-benzylphenyl; and alkenyl containing up to 18 carbon atoms such as, for example, allyl, but-3-en-1-yl, oct-7-en-1-yl, and octadec-17-en-1-yl. These radicals, furthermore may be substituted by one to three of the halogens with atomic weight below 150, e.g., chlorine, bromine, iodine or fluorine, or one lower alkoxy, lower alkoxycarbonyl, or lower acyloxy group. By lower alkoxy is meant an alkoxy group containing up to 6 carbon atoms, as for example, methoxy, ethoxy, propoxy, isopropoxy, butoxy, and N-hexoxy. By lower alkoxycarbonyl is meant an alkoxycarbonyl group, i.e., an ester group,

having up to 7 carbon atoms, as for example, methoxycarbonyl, ethoxycarbonyl, propoxycarbonyl and n-hexoxycarbonyl. By lower acyloxy is meant acyloxy groups having up to 6 carbon atoms as, for example acetyloxy, propionyloxy, and hexanoyloxy groups. It will be recognized that halogens, chlorine and bromine, have atomic weights of about 35.5 and 79.9 respectively.

The substituted bis(fluoroalkylsulfonyl)halomethanes of the invention are conveniently prepared by chlorination or bromination of the alkali metal salts of substituted bis(fluoroalkylsulfonyl)methanes, which process may be represented by the schematic equation.

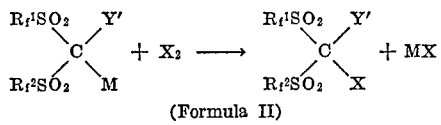

(Formula II)

where $R_f^1$, $R_f^2$, X and Y' are as hereinbefore defined and M is an alkali metal.

Generally, the alkali metal salts of substituted bis-(fluoroalkylsulfonyl)methanes are readily formed by reaction of substituted bis(fluoroalkylsulfonyl)methanes with aqueous or alcoholic alkali metal hydroxides, alkoxides, oxides, carbonates or acetates.

The chlorination and bromination reaction is advantageously carried out in solvents which are inert with respect to the reactants or products. eGnerally, solvents commonly employed for chlorination and bromination can be employed such as carbon tetrachloride, methylene chloride, acetic acid, water and the like. The halogenation reaction usually occurs at about room temperature, however, temperatures up to 100° C. or higher may be required in some instances.

The substituted bis(fluoroalkylsulfonyl)methanes of the structural formula

(Formula III)

where Y' is chlorine or bromine are prepared by formation of the organo-metallic halide of the corresponding unsubstituted bis(fluoroalkylsulfonyl)methane followed by reaction with chlorine or bromine, in accordance with the schematic equations

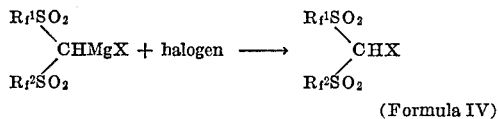

(Formula IV)

Alkyl, alkenyl or aralkyl substituted bis(fluoroalkylsulfonyl)methanes are formed by the following schematic procedures:

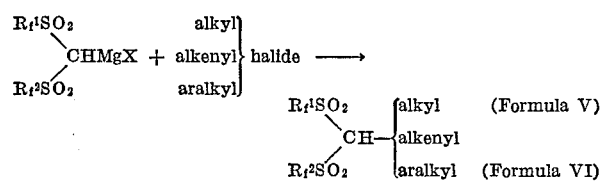

(Formula V)
(Formula VI)

Where Y' of Formula III is aryl, the substituted bis-(fluoroalkylsulfonyl)methanes are prepared by formation of the aryl organo-metallic halide of the corresponding arylmethyl halide followed by reaction with fluoroalkyl sulfonyl fluoride in accordance with the schematic equation

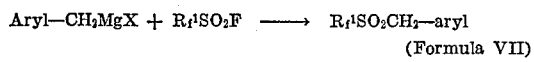

(Formula VII)

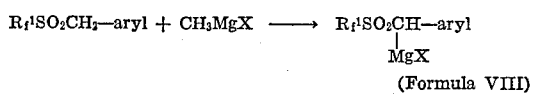

(Formula VIII)

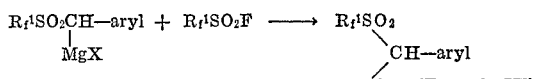

(Formula IX)

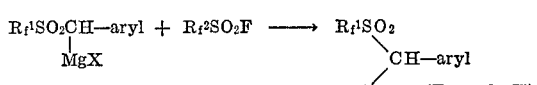

(Formula X)

The reaction of Formulas IV–X inclusive are most conveniently performed in a solvent such as anhydrous diethyl ether or tetrahydrofuran at temperatures from about −20° C. to about 100° C. using ratios of reactants from about 1 equivalent weight of the first listed reactant to from about 0.5 to 1.5 equivalent weight of the other second reactant. The reaction may be carried out at atmospheric pressure or under autogenous pressure.

Further compounds of the invention are prepared by the addition of the bis(fluoroalkylsulfonyl)dibromomethanes and the bis(fluoroalkylsulfonyl)bromochloromethanes of the invention to olefinic compounds in accordance with the schematic equation

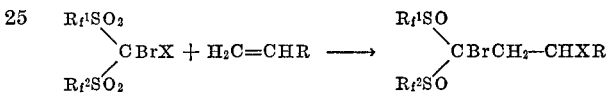

wherein $R_f^1$, $R_f^2$, and X are as hereinbefore defined and —CH$_2$—CHXR is Y as above-defined substituted by the halogen X.

The compounds of the invention, although possessing strongly electron-withdrawing, $R_fSO_2$ groups are essentially neutral and insensitive toward basic media such as aqueous solutions of inorganic bases. The compounds liberate iodine from potassium iodide solutions and, therefore are useful as oxidizing agents in organic synthesis in somewhat the manner of N-bromosuccinimide. The compounds of the invention are also selective halogenating agents for side chain halogenation of aromatic and heterocyclic compounds, such as for example, the bromination under free radical conditions of toluene by $(CF_3SO_2)_2CBr_2$ to yield benzyl bromide. Other compounds that can be selectively halogenated include 2-methylthiophene, 5-methyluracil, 2,5-dimethyl-4,5-dichloropyrimidine, benzylbromide, p-chlorotoluene, p-nitrotoluene, p-toluenesulfonyl fluoride, p-tolylboric acid, 4-methyl-5-carbethoxy-2-imidazole, ethyl benzene, p-cymene, durene, 2-methyl-naphthalene, fluorene and bibenzyl.

The substituted bis(fluoroalkylsulfonyl)-methanes of the invention, furthermore, are useful as latent catalysts for the polymerization of epoxides, vinyl ethers and N-vinyl compounds. Because of their sensitivity to UV light (generating free radicals) they are most satisfactorily stored in dark glass bottles. Compositions containing such monomers and 0.5 to 5% by weight of the majority of the compounds of the invention polymerize only very slowly under ordinary conditions, e.g., 24 hours or longer are required to effect polymerization. Such compositions, however, are polymerized in from about 0.5 to 10 minutes when exposed to ultraviolet light or heated at 25 to 150° C. in the presence of 0.01 to 3% by weight of a free radical initiator. The bis-(fluoroalkylsulfonyl)dibromomethanes of the invention (a compound having the structure of Formula I in which both X and Y are bromine), however, are extremely rapid acting polymerization catalysts. Bis(perfluoromethylsulfonyl) - dibromomethane when added 1% by weight to an epoxy resin at room temperature and under ordinary light polymerizes the resin to a hard resin within half a minute.

Typical of monomers which can be homopolymerized or copolymerized by the compounds of the invention are: glycidol, glycidyl methacrylate, propylene oxide, ethylene oxide, epoxichlorohydrin, styrene oxide, vinylcyclohexene-dioxide, dipentene dioxide, 3,4-epoxycyclohexylmethyl-3,4 - epoxycyclohexane carboxylate, bis(3,4 - epoxy-6-methyl-cyclohexylmethyl)adipate, N,N - di(2,3-epoxypropyl)methane sulfonamide, polyglycidyl ether of phenol-formaldehyde novolac, 2-ethylhexyl vinyl ether, N-vinyl pyrrolidone, N-vinyl carbazole, and N-vinyl-N-methyl methane sulfonamide.

Typical free radical initiators that may be used to accelerate the thermal polymerization of monomers by the compounds of the invention include: benzoyl peroxide, acetyl peroxide, $\alpha,\alpha'$-azobisisobutyronitrile, t-butylhydroperoxide, cumene hydroperoxide, di-t-butyl peroxide, azodicyclohexylcarbonitrile, dimethyl - $\alpha,\alpha$-azodiisobutyrate, succinyl peroxide, dicumyl peroxide, and dichlorobenzoyl peroxide. These initiators produce free radicals at different temperatures.

The invention is now further illustrated by the following examples showing the best mode presently contemplated of practicing the invention. In these examples, all parts are given by weight and temperatures in centigrade unless otherwise specified.

EXAMPLE 1

This example illustrates the preparation of 1,1-bis(perfluoromethylsulfonyl)-1-bromoethane, $$(CF_3SO_2)_2CBrCH_3$$

The potassium salt of 1,1-bis(perfluoromethylsulfonyl)-ethane, $(CF_3SO_2)_2C^-CH_3K^+$ is prepared from 15 g. (0.05 mole) of 1,1-bis(perfluoromethylsulfonyl)ethane in 75 ml. of methanol by neutralization with 4 g. of potassium carbonate followed by filtration, evaporation and drying at 100° C. in vacuo. The salt is dispersed in 100 ml. of carbon tetrachloride and 8.0 g. (0.055 mole) of bromine in 10 ml. of carbon tetrachloride is added. The mixture is stirred at room temperature for one hour, filtered and the filtrate distilled to remove solvent and then to yield about 13.5 g. of 1,1-bis(perfluoromethylsulfonyl)-1-bromoethane, B.P. 89–90° C. at 10 mm. Hg.

EXAMPLE 2

1,1 - bis(perfluorobutylsulfonyl)-1-bromoethane is prepared from 98 g. (0.16 mole) of the potassium salt of 1,1 - bis(perfluorobutylsulfonyl)ethane and 26 g. (0.16 mole) of bromine by employing conditions similar to those used in Example 1. There is obtained 85 g. of 1,1-bis(perfluorobutylsulfonyl)-1-bromoethane, M.P. 79–80.5 (after recrystallization from hexane).

EXAMPLE 3

This example illustrates the preparation of 1,1-bis(perfluoromethylsulfonyl)dichloromethane.

Essentially the procedure of Example 1 is repeated using mixture of 20 g. (0.06 mole) of the potassium salt of bis(perfluoromethylsulfonyl)chloromethane in 100 ml. of carbon tetrachloride and adding about 10 g. (0.14 mole) of gaseous chlorine during one hour. The system is flushed with nitrogen to remove excess chlorine, the resultant mixture filtered and the filtrate distilled to remove solvent and then to yield about 15.5 g. of bis(perfluoromethylsulfonyl)dichloromethane, $(CF_3SO_2)_2CCl_2$, B.P. 95–96° at 40 mm. Hg.

EXAMPLE 4

The potassium salt of bis(perfluoromethylsulfonyl) bromomethane is brominated by essentially the procedures of Example 1 to yield bis(perfluoromethylsulfonyl)-dibromomethane, B.P. 108–109° at 17 mm. Hg.

EXAMPLE 5

This example illustrates an alternative method for preparing compounds of the invention.

A solution of sodium hypobromite is first prepared by adding bromine (5.8 g.; 0.04 mole) to a solution of 4.3 g. of sodium hydroxide in 50 ml. of water and then a solution of 5 g. (0.02 mole) of bis(perfluoromethylsulfonyl)-methane and 2.5 g. (0.06 mole) of sodium hydroxide in 25 ml. of water is added. The mixture is stirred at room temperature for 60 hours and filtered. The filtrate is acidified with 3N HCl and the lower organic phase separated, dried and distilled to yield about 3.7 g. of bis(perfluoromethylsulfonyl)dibromomethane.

EXAMPLES 6–20

Table I lists other compounds of the invention and the substituted bis(fluoroalkylsulfonyl)methane from which they are made using procedures as described above.

TABLE I

| Example | Substituted bis(fluoroalkylsulfonyl)methane | Halogenating agent | Product |
|---|---|---|---|
| 6 | $(CF_3SO_2)_2CHCl$ | $Br_2$ | $(CF_3SO_2)_2CBrCl$ |
| 7 | $(CF_3SO_2)_2CHC_6H_5$ | $Br_2$ | $(CF_3SO_2)_2CBrC_6H_5$ |
| 8 | $(CF_3SO_2)_2CHCH_2CH_2O\overset{O}{\underset{\|}{C}}CH_3$ | $Br_2$ | $(CF_3SO_2)_2CBrCH_2CH_2O\overset{O}{\underset{\|}{C}}CH_3$ |
| 9 | $C_8F_{17}SO_2CHBrSO_2CF_3$ | $Br_2$ | $C_8F_{17}SO_2CBr_2SO_2CF_3$ |
| 10 | $(C_{12}F_{25}SO_2)_2CHCH_3$ | $Br_2$ | $(C_{12}F_{25}SO_2)_2CBrCH_3$ |
| 11 | $(CF_3)_2CFSO_2CHClSO_2CF_3$ | $Cl_2$ | $(CF_3)_2CFSO_2CCl_2SO_2CF_3$ |
| 12 | $(CF_3SO_2)_2CHCH_2CH=CH_2$ | $Cl_2$ | $(CF_3SO_2)_2CClCH_2CH=CH_2$ |
| 13 | $(CF_3SO_2)_2CHCH_2CHBrCH_2C_5H_{11}$ | $Br_2$ | $(CF_3SO_2)_2CBrCH_2CHBrCH_2C_5H_{11}$ |
| 14 | $(CF_3SO_2)_2CHCH_2CHBrCH_2CH_2Cl$ | $Br_2$ | $(CF_3SO_2)_2CBrCH_2CHBrCH_2CH_2Cl$ |
| 15 | $(CF_3SO_2)_2CHCH_2CHBr(CH_2)_8\overset{O}{\underset{\|}{C}}OCH_3$ | $Cl_2$ | $(CF_3SO_2)_2CClCH_2CHBr(CH_2)_8\overset{O}{\underset{\|}{C}}OCH,$ plus $(CF_3SO_2)_2CClCH_2CHBr(CH_2)_8\overset{O}{\underset{\|}{C}}OH_3$ |
| 16 | $(CF_3SO_2)_2CHC_5H_{11}$ | $Br_2$ | $(CF_3SO_2)_2CBrC_5H_{11}$ |
| 17 | $(CF_3SO_2)(C_8F_{17}SO_2)CHC_5H_{11}$ | $Cl_2$ | $(CF_3SO_2)(C_8F_{17}SO_2)CClC_5H_{11}$ |
| 18 | $(CF_3SO_2)_2CHCH_2CHBrC\overset{O}{\underset{\|}{}}OCH_3$ | $Br_2$ | $(CF_3SO_2)_2CBrCH_2CHBrC\overset{O}{\underset{\|}{}}OCH_3$ |
| 19 | $(CF_3SO_2)_2CHCH_2CH_2OCH_3$ | $Br_2$ | $(CF_3SO_2)_2CBrCH_2CH_2OCH_3$ |
| 20 | $(C_4F_9SO_2)_2CH(CH_2CH_2)_nBr$ | $Br_2$ | $(C_4F_9SO_2)_2CBr(CH_2CH_2)_nBr$ |

EXAMPLES 21–29

The examples presented in Table II illustrate the catalytic effect of substituted bis(fluoroalkylsulfonyl)halomethanes in the polymerization of monomers. Methylene chloride solutions containing 30% by weight of the substituted bis(fluoroalkylsulfonyl)halomethane, listed as "catalyst" in Table II are prepared and the solutions washed with 5% aqueous potassium carbonate to remove any acidic impurity. Three percent by weight of the solution is added to the "epoxides" listed in Table II and the mixture exposed to the "conditions" given in Table II. In the table "photolyzed" means exposure at 29° C. to the output from a 140 watt Hanovia ultraviolet lamp, Type 30620.

a mixture of 6.0 g. (0.017 mole) of the dry potassium salt and 25 ml. of $CCl_4$ is added 2.7 g. (0.017 mole) bromine in 5 ml. $CCl_4$. After being stirred for 1 hour at room temperature, the mixture is filtered and the filtrate distilled. The product, B.P. 85–88° (at 5 mm. of Hg pressure) is mainly $(CF_3SO_2)_2CBr$—$CH_2$—$CH=CH_2$. An infrared absorption peak at 6.08 microns shows olefinic unsaturation. Proton nuclear magnetic resonance shows vinyl protons at 3.5 to 4.8 $\tau$ and —$CH_2$— protons at 6.44 $\tau$ (doublet).

Calculated for $C_6H_5F_6BrS_2O_4$: C, 18.1; F, 28.6; Br, 20.1. Found: C, 17.9; F, 28.3; Br, 20.8.

The compound liberates iodine from potassium iodide solution instantly.

TABLE II

| Example | Epoxide | Catalyst | Conditions | Results |
|---|---|---|---|---|
| 21 | ERL 4221 [a] | $(CF_3SO_2)_2CBrCH_3$ | Photolyzed [b] for 9 min | High degree of gel. sample removed and kept at 25° for 2 hrs., giving hard polymer. |
| 22 | ERL 4221 | $(CF_3SO_2)_2CCl_2$ [c] | Photolyzed for 30 min. (surface film after 15 min.). | Gel formed. Sample removed and kept at 25° for 15 hrs. to give hard polymer. |
| 23 | ERL 4221 | $(CF_3SO_2)_2CBr_2$ | 25° (15 sec.) | Exothermic polymerization. |
| 24 | ERL 4221 | $(CF_3SO_2)_2CBrCH_3$ | {25° (24 hrs)<br>{25° (40 hrs.) | Fluid.<br>Tacky polymer. |
| 25 | ERL 4221 | $(CF_3SO_2)_2CCl_2$ plus 0.03 wt. percent benzoyl peroxide. | 130° [d] (10 min) | Hard polymer. |
| 26 | Glycidol | do | 110° (2 min.) | Exothermic polymerization. |
| 27 | do | $(CF_3SO_2)_2CCl_2$ | {110° (15 min.)<br>{110° (1 hr.) | No polymer.<br>Clear and viscous. |
| 28 | do | $(CF_3SO_2)_2CBrCH_3$ plus 0.03 wt. percent benzoyl peroxide. | 110° (40 sec.) | Exothermic polymerization. |
| 29 | do | $(CF_3SO_2)_2CBrCH_3$ | 110° (2 min.) | Do. |

[a] ERL 4221 is 3,4-epoxycyclohexylmethyl-3,4-epoxycyclohexane carboxylate, available from Union Carbide.
[b] Photolyzing ERL 4221 for 4 hours without catalyst gives no indication of polymerization.
[c] In the absence of light and at room temperature, no polymerization occurs in at least 5 days.
[d] Heating of ERL 4221 for 24 hours at 130° C. gives no appreciable polymerization.

EXAMPLE 30

This example illustrates the use of the substituted bis(fluoroalkylsulfonyl)halomethane as halogenating agents.

A mixture of 4.6 g. (0.05 mole) of toluene, 11 g. (0.03 mole) of 1,1 - bis(perfluoromethylsulfonyl)dibromomethane and 0.3 g. of azodiisobutyronitrile is heated at 75° for 20 hours. Distillation yields about 4.5 g. of benzyl bromide and 1.5 g. of benzal bromide.

EXAMPLE 31

This example illustrates the preparation of alkenyl and halogen substituted (bis(fluoroalkylsulfonyl)halomethanes by the addition of bis(fluoroalkylsulfonyl)dihalomethanes to olefinic compounds.

A solution of 10 g. (0.02 mole) of bis(perfluoromethylsulfonyl)dibromomethane and freshly distilled octene-1 is irradiated in a closed quartz bulb with a 140 watt Hanovia lamp for 7 hours. Distillation of the mixture gives 7.5 g. of adduct, B.P. 93–96° at 0.05 mm. indicated by nuclear magnetic resonance to contain mainly

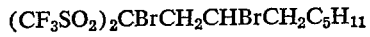
$(CF_3SO_2)_2CBrCH_2CHBrCH_2C_5H_{11}$ and $(CF_3SO_2)_2CBrCH_2CH=CHC_5H_{11}$.

EXAMPLE 32

4,4-bis(perfluoromethylsulfonyl)butene-1,

$(CF_3SO_2)_2CH$—$CH_2$—$CH=CH_2$ is converted to the potassium salt by neutralization with potassium carbonate in methanol as described above. To

What is claimed is:
1. Bis(fluoroalkylsulfonyl)halomethanes of the formula WY wherein W is halo-bis(fluoroalkylsulfonyl)methyl and Y is
   (1) halogen of atomic weight from 35 to 80 inclusive,
   (2) unsubstituted, straight, branched or cyclic hydrocarbon radical of up to about 18 carbon atoms,
   (3) omega alkenyl having 3 to 18 carbon atoms of the formula —$(CH_2)_n$—$CH=CH_2$ in which $n$ is an integer from 1 to 16 or
   (4) halogen or lower alkoxy substituted, straight, branched or cyclic, hydrocarbon radical of up to about 25 carbon atoms.

2. Bis(fluoroalkylsulfonylhalomethane according to claim 1 wherein the halo-bis(fluoroalkylsulfonyl)methyl group is bromo-bis(perfluoromethylsulfonyl)methyl and Y is halogen of atomic weight from 35 to 80 inclusive.

3. Bis(fluoroalkylsulfonyl)halomethane according to claim 1 wherein the halo-bis(fluoroalkylsulfonyl)methyl group is bromo-bis(perflouroalkylsulfonyl)methyl and Y is methyl.

References Cited
UNITED STATES PATENTS 3,281,472   10/1966   Heine _____ 260—607 A LEWIS GOTTS, Primary Examiner D. R. PHILLIPS, Assistant Examiner U.S. Cl. X.R.

260—481, 488, 241.1, 293.85

UNITED STATES PATENT OFFICE
CERTIFICATE OF CORRECTION

Patent No. 3,794,687　　　　　　　　Dated February 26, 1974

Inventor(s) Robert J. Koshar

It is certified that error appears in the above-identified patent and that said Letters Patent are hereby corrected as shown below:

Column 2, lines 11-13, the formula reading

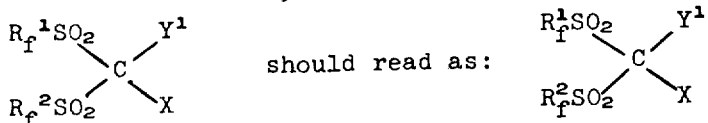

should read as:

Column 2, line 15, "$R^1{}_f$ and $R^2{}_f$" should read as: -- $R_f^1$ and $R_f^2$ --

Column 3, lines 10-12, the formula reading

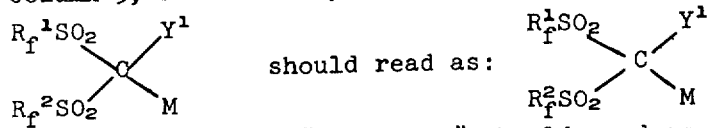

should read as:

Column 3, line 26, "eGnerally" should read as --Generally--.

Column 5, Example 12, the formula reading:
" $(CF_3SO)_2)CHCH_2CH=\!=CH_2$ " should read:
-- $(CF_3SO_2)_2CHCH_2CH=\!=CH_2$ --

Column 6, Example 15, the formula reading:

"$(CF_3SO_2)_2CClCH_2CHBr(CH_2)_8C\overset{O}{C}CH$" should read as:

-- $(CF_3SO_2)_2CClCH_2CHBr(CH_2)_8\overset{O}{C}OCH_3$ --

Column 6, Example 15, second and last part of formula reading:
" $COH_3$ " should read as: -- $\overset{O}{C}OH$ --

Column 7, line 46, " (bls(fluoroalkylsulfonyl) " should read as: -- bis(fluoroalkylsulfonyl) --

Column 8, Claim 2, the word "Bis(fluoroalkyl sulfonylhalomethane" should read as -- Bis(fluoroalkylsulfonyl)halomethane --

Signed and sealed this 9th day of July 1974.

(SEAL)
Attest:

McCOY M. GIBSON, JR.　　　　　　　　C. MARSHALL DANN
Attesting Officer　　　　　　　　　　Commissioner of Patents